Patented Mar. 11, 1952

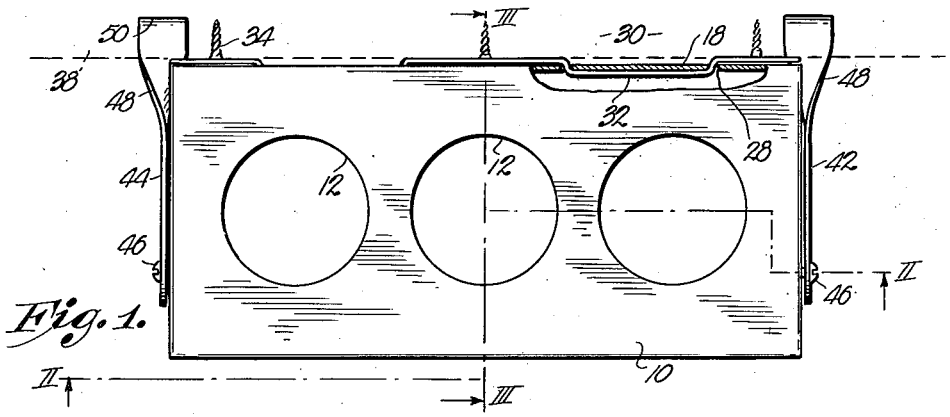
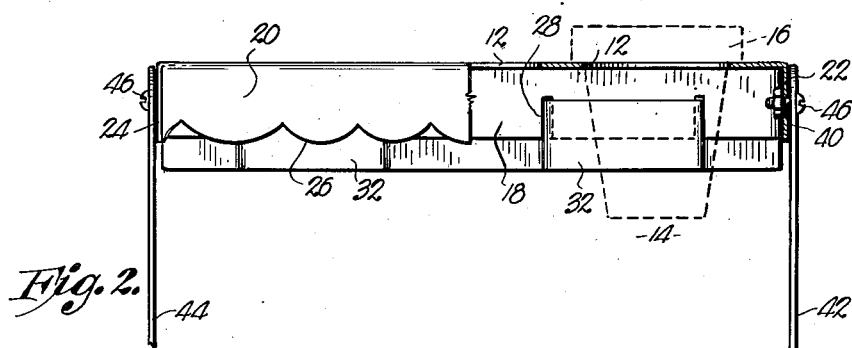
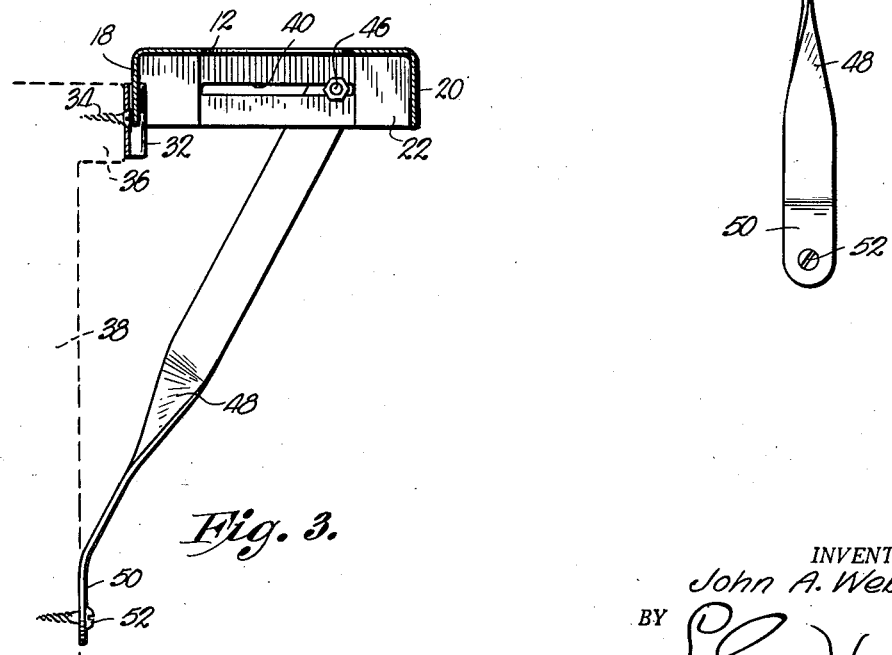

2,588,596

UNITED STATES PATENT OFFICE 2,588,596

FLOWER POT SUPPORTING SHELF

John A. Weber, Shawnee, Kans.

Application March 7, 1949, Serial No. 80,065

1 Claim. (Cl. 248—311)

This invention has to do with a holder for flower pots, taking the form of a shelf-like body having a plate provided with pot-receiving openings, the primary object being to provide novel means for removably attaching the same to a wall, window frame, or the like and having specially formed adjustable bracing structure capable of maintaining the pot-supporting plate in a horizontal position.

It is the most important object of the present invention to provide a flower pot holder having a horizontal plate provided with a downturned, slotted flange along one edge thereof for receiving in locked relationship thereto, through use of the slots, a specially formed bracket that is adapted for rigid attachment to a window sill, wall, or other supporting surface.

Other important objects of the present invention is to provide a flower pot holder having a horizontal plate provided with slotted, downturned flange on each end respectively thereof, for slottedly receiving the uppermost end of an inclined brace, the braces being secured directly to the wall and having means for releasably joining the same to said flanges, all to the end that the plate itself may be secured in a directly horizontal position.

Other more minor objects will be made clear or become apparent as the following specification progresses, reference being had to the accompanying drawing wherein:

Figure 1 is a top-plan view of a flower pot supporting shelf, made in accordance with my present invention, parts being broken away and in section to reveal details of construction.

Fig. 2 is a fragmentary, cross-sectional view taken on irregular line II—II of Fig. 1, looking in the direction of the arrows; and Fig. 3 is a transverse, cross-sectional view, taken on line III—III of Fig. 1.

A flat plate 10 is provided with a plurality of circular openings 12 for accommodating flower pots to be supported thereby.

As is well known, the usual type of flower pot 14 is frusto-conical and provided with an outwardly extended annular flange 15 near the uppermost end thereof. Accordingly, such pots 14 will conveniently fit within the openings 12 and the aforesaid flange 16 thereof will rest directly upon the plate 10 along the marginal edge of the respective openings 12. As shown in Fig. 2, virtually all of the pot 14 will depend from the horizontal plate 10.

Plate 10 is provided with a continuous downturned flange having a back stretch 18, a front portion 20, and end portions 22 and 24. For attractiveness, the portion 20 may have scalloped edge, as at 26, or formed in any desirable manner.

A plurality of spaced apart vertical slots 28 formed in the flange portion 18 extend upwardly from the lowermost edge of the latter and are all relatively parallel.

A bracket, broadly designated by the numeral 30, comprises an elongated strap having a pair of spaced apart offset portions 32 formed therein. A plurality of openings formed in bracket 30 and adapted to receive fastening elements, such as screws 34, whereby bracket 30 may be secured directly to any wall or, as shown in Fig. 3, to a protruding sill 36 of a window frame 38. When bracket 30 is so secured flatly against the vertical edge of sill 36, the offset portions 32 will be spaced away slightly from sill 36 and permit the mounting of flange portion 18 of plate 10. This mounting, as illustrated, constitutes an insertion of that portion of flange 18 between each pair of slots 28, the offset portion 32 of bracket 30 and sill 36. In other words, the slots 28 slidably receive the bracket 30 and when in the operative position, the uppermost ends of the slots 28 rest directly upon the uppermost edge of bracket 30. The two end flanges 22 and 24 of plate 10 are each provided with an elongated slot 40. Inclined braces 42 and 44 are provided for flanges 22 and 24 respectively.

Braces 42 and 44 each constitute an elongated strap having an opening near the uppermost end thereof for receiving a bolt 46 or like fastening element. Bolts 46 pass through corresponding slots 40 and are adapted to attach the braces 42 and 44 rigidly to the respective flanges 22 and 24. Each strap 42 is twisted intermediate the ends thereof, as at 48, and bent angularly, as at 50, near the lowermost end thereof. The portion 50 of each brace 42 and 44 lies flatly against windowframe 38 and is secured thereto by screws 52.

It is clear from the foregoing that the plate 10 may be secured in place in a horizontal position by sliding the bolts 46 along the slots 40 and thereupon tightly secure bolts 46 to hold the plate 10 in such position.

The fit between flange 18 and the bracket 30 is sufficiently loose to permit swinging of plate 10 when such adjustment takes place, to the end that the truly horizontal condition of plate 10 can be obtained.

An important feature of the present invention to be noted lies in the fact that through use of the adjustably mounted braces 42 and 44, together with the bracket connection 30, flowerpot shelves of the character herein disclosed can be mounted upon irregular surfaces such as window frames 38 and their corresponding protruding sill portions 36, while assuring at all times that the uppermost surface of the support itself will always be horizontal.

It is also clear that the entire shelf is not only attractive and neat but requires little space, is easy and inexpensive to manufacture and can be mounted and assembled by those other than skilled artisans.

Manifestly, the desire is subject to change in many details but all modifications that fairly come within the scope of the appended claim are contemplated hereby.

Having thus described the invention, what is claimed as new and desired to be secured by Letters Patent is:

A flower pot support comprising a hollow, open-bottom body having a flat top plate provided with a flower pot-receiving opening, and a continuous, downturned, peripheral flange integral with said plate; a pair of opposed, elongated, horizontal slots formed in the flange; a pair of spaced, vertical slots formed in the flange between the horizontal slots and extending upwardly from the lowermost end of the flange; a wall bracket on the outer face of said flange and extending through the vertical slots in looped relationship to a portion of the flange between the vertical slots; a wall brace for each horizontal slot respectively; and means on each brace respectively extending through the corresponding horizontal slot for releasably securing the braces to the flange, said means each being adapted on release for sliding movement in the horizontal slot thereof whereby to permit leveling of said plate.

JOHN A. WEBER.

REFERENCES CITED

The following references are of record in the file of this patent:

UNITED STATES PATENTS

| Number | Name | Date |
| --- | --- | --- |
| 478,336 | Kissling | July 5, 1892 |
| 1,989,294 | Serpico | Jan. 29, 1935 |
| 2,103,106 | Yurkovitch | Dec. 21, 1937 |